M. L. LOCKHART.
CALIPERS.
APPLICATION FILED NOV. 28, 1914.
1,152,191.
Patented Aug. 31, 1915.
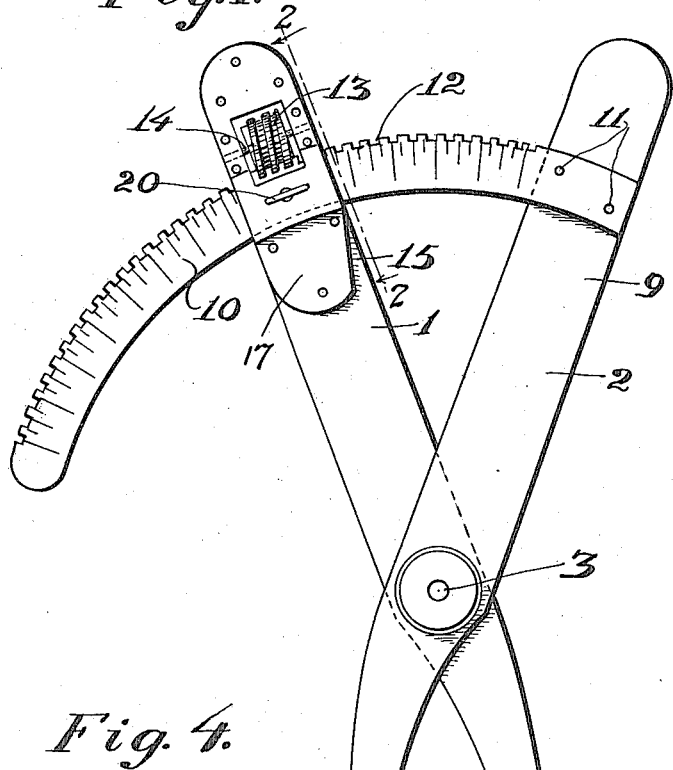
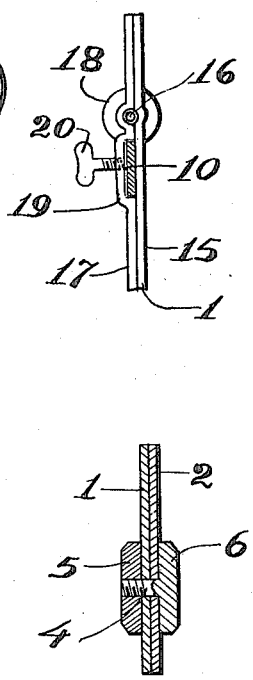
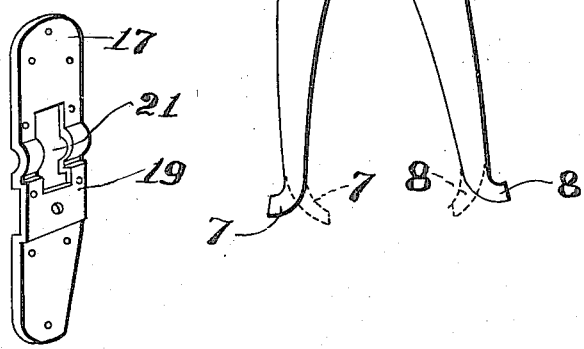
Witnesses
Inventor
M. L. Lockhart.
By
Attorney

UNITED STATES PATENT OFFICE.

MARTIN L. LOCKHART, OF BRIDGETON, NORTH CAROLINA.

CALIPERS.

1,152,191. Specification of Letters Patent. Patented Aug. 31, 1915.

Application filed November 28, 1914. Serial No. 874,460.

*To all whom it may concern:*

Be it known that I, MARTIN L. LOCKHART, a citizen of the United States, residing at Bridgeton, in the county of Craven and State of North Carolina, have invented certain new and useful Improvements in Calipers; and I do hereby declare the following to be a full, clear, and exact description of the invention, such as will enable others skilled in the art to which it appertains to make and use the same.

This invention relates to calipers and the primary object of the invention is to provide a pair of calipers of the pivoted jaw type which have an arcuate scale associated therewith, and to provide upon one of the pivoted measuring jaws or legs of the caliper means for feeding the leg along a graduated arcuate scale for accurate and concise measuring purposes.

Another object of this invention is to provide means by means of which the two measuring jaws may be held securely in any adjusted position for maintaining a uniform spaced width of the measuring jaws for various purposes such as getting the number of machine parts exactly the same size.

With the foregoing and other objects in view this invention consists in such novel features of construction, combination and arrangement of parts as will be hereinafter more fully described illustrated in the accompanying drawings and claimed.

In describing the invention in detail reference will be had to the accompanying drawings wherein like characters designate like or corresponding parts throughout the several views, and in which:—

Figure 1 is a plan view of the improved caliper. Fig. 2 is a cross sectional view on the line 2—2 of Fig. 1. Fig. 3 is a cross sectional view through the pivotal point of the caliper measuring legs, and Fig. 4 is a detail perspective view of the plate used in the construction of the caliper.

Referring more particularly to the drawings, 1 and 2 designate the measuring legs of the caliper which are pivoted intermediate their ends as is shown at 3. The caliper legs 1 and 2 are pivoted to each other by means of the headed pin 4 which extends through the caliper legs and has one end screw threaded and seated in a nut 5. The headed pin 4 has a head 6 formed thereupon which is substantially the same size as the nut 5, so as to insure the efficient connecting of the caliper legs 1 and 2 and also of their easy pivotal movement for the proper spacing of the measuring ends or jaws 7 and 8 of the legs. In Fig. 1 of the drawings, the measuring ends or jaws of the caliper legs 1 and 2 are shown curved outwardly for inside measurement, in solid lines, and curved inwardly for outside measurement in dotted lines, and it is to be understood that either of these forms may be resorted to, or any of the other well known forms of bending the measuring ends of the caliper legs without departing from the spirit of this invention.

The upper end of the caliper legs or the ends which extend upwardly from the pivotal point 3 are of increased size with respect to the lower ends of the legs upon which the measuring jaws are formed and the upper end 9 of the leg 2 has an arcuate scale 10 rigidly connected thereto as is shown at 11. The arcuate scale 10 extends transversely from the upper end 9 of the leg 2 and is provided with graduations designating any suitable type of linear measure. The upper edge of the arcuate scale 10 is provided with teeth 12, which are adapted for engagement with the worm teeth 13 formed upon the worm 14. The worm 14 is carried by the upper end 15 of the leg 1 and is rotatably mounted upon a pin 16. The pin 16 is supported against one surface of the upper end 15 of the leg 1 by a plate 17 which is secured to the leg in any suitable manner and has an outstruck portion 18 formed thereupon, which forms bearings for the pin 16. The plate 17 has a second outstruck portion 19 formed thereupon which forms a guideway for the arcuate graduated scale 10. A thumb screw 20 is carried by the guideway 19, and is provided for engagement with the surface of the arcuate scale 10 for holding the leg 1 in any adjusted position along the scale, for holding the measuring jaws 7 and 8 at any desired spaced relation to each other. The plate 17 and the upper end 15 of the leg 1 are provided with cut out portions 21, formed therein, which receive the worm 14, so as to permit of the worm teeth 13 to properly engage the teeth 12 formed upon the upper edge of the arcuate scale 10. The plate 17 is securely and rigidly attached to the upper end 15 of the leg 1.

In the operation of the improved caliper, when it is desired to measure an article by the calipers, the measuring ends 7 and 8 of the calipers are moved, by rotating the worm 14 by the operator's thumb and finger, until the desired position is reached upon the arcuate scale 10 which designates the distance between the measuring surfaces of the measuring ends 7 and 8, and then the thumb screw 20 is tightened for maintaining the measuring surfaces at the desired distance, and thus the use of an extra scale may be dispensed with, and the exact measurements of the article readily ascertained.

In reducing the invention to practice certain minor features of construction, combination and arrangement of parts may necessitate alterations to which the patentee is entitled provided such alterations are comprehended within the scope of what is claimed.

What is claimed is:—

1. In a pair of calipers, a pair of legs pivotally connected intermediate their ends, an arcuate scale secured to the upwardly projecting end of one of said legs, rack teeth formed upon the upper edge of said scale, and a worm carried by the upper end of the other leg for coaction with said rack teeth for moving said legs toward or from each other.

2. In a pair of calipers, a pair of legs pivotally connected intermediate their ends, the ends of said legs which extend downwardly from the pivotal point having measuring points formed thereon, an arcuate scale secured to the upwardly extending end of one of said legs, a plate secured to the upper end of the other of said legs and having an outstruck portion formed thereon, said arcuate scale being slidably seated within said outstruck portion, said plate and the upper end of the leg to which it is attached being provided with cut out portions formed therein, a worm gear rotatably seated within said cut out portions, teeth formed upon the upper edge of said arcuate scale for coaction with said worm for feeding the leg which carries said worm outwardly along said scale.

3. In a pair of calipers, a pair of legs pivotally connected intermediate their ends, the ends of said legs which extend downwardly from the pivotal point having measuring points formed thereon, an arcuate scale secured to the upwardly extending end of one of said legs, a plate secured to the upper end of the other of said legs and having an outstruck portion formed thereon, said arcuate scale being slidably seated within said outstruck portion, said plate and the upper end of the leg to which it is attached being provided with cut out portions formed therein, a worm gear rotatably seated within said cut out portions, teeth formed upon the upper edge of said arcuate scale for coaction with said worm for feeding the leg which carries said worm outwardly along said scale, and means for holding said legs in any adjusted position with respect to each other.

4. In a pair of calipers, a pair of legs pivotally connected intermediate their ends, an arcuate scale secured to the upwardly projecting end of one of said legs, rack teeth formed upon the upper edge of said scale, a worm carried by the upper end of the other leg for coaction with said rack teeth for moving said legs toward or from each other, and a thumb screw carried by said worm supporting leg for clamping engagement with said arcuate scale for holding said legs in adjusted positions.

In testimony whereof I affix my signature in presence of two witnesses.

MARTIN L. LOCKHART.

Witnesses:
J. C. BROOKS,
J. N. TINGLE.